Figure 10:
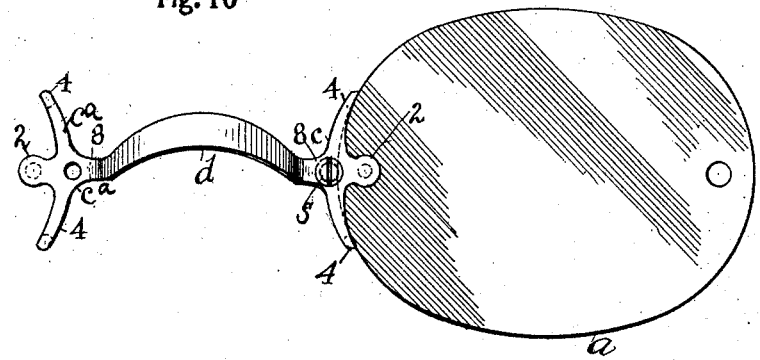

G. A. SQUIER.
CLAMP FOR EYEGLASSES.
APPLICATION FILED DEC. 4, 1911.
1,040,045.
Patented Oct. 1, 1912.
2 SHEETS—SHEET 1.
Fig. 1
Fig. 2
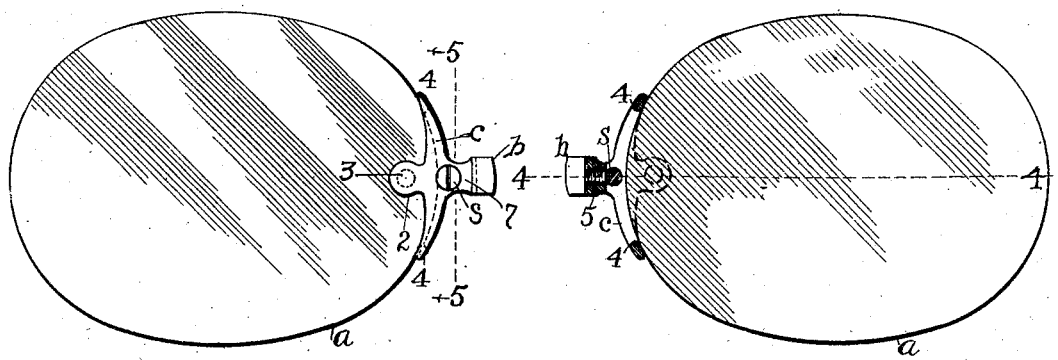
Fig. 3
Fig. 4
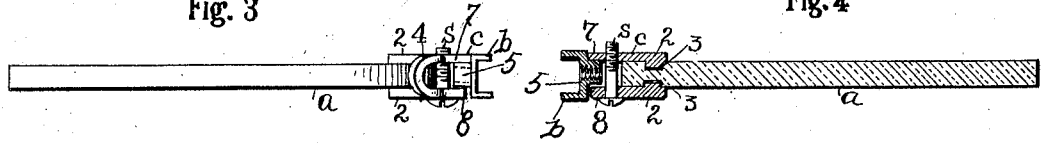
Fig. 5
Fig. 6
Fig. 7
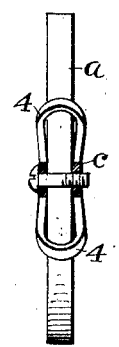
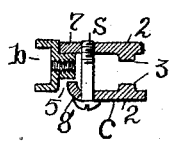
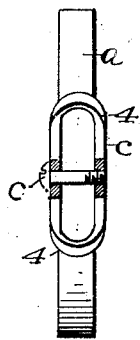
Fig. 8
Fig. 9
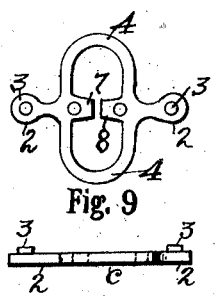
ATTEST
E. M. Fisher
F. C. Mussun
INVENTOR
George A. Squier
BY Fisher Allott ATTYS.

G. A. SQUIER.
CLAMP FOR EYEGLASSES.
APPLICATION FILED DEC. 4, 1911.

1,040,045.

Patented Oct. 1, 1912.

2 SHEETS—SHEET 2.

ATTEST
E. M. Fisher
F. C. Mueuen

INVENTOR
George A. Squier.
BY Fisher & Mosher ATTYS.

UNITED STATES PATENT OFFICE.

GEORGE A. SQUIER, OF CLEVELAND, OHIO.

CLAMP FOR EYEGLASSES.

1,040,045.  Specification of Letters Patent. Patented Oct. 1, 1912.

Application filed December 4, 1911. Serial No. 663,671.

*To all whom it may concern:*

Be it known that I, GEORGE A. SQUIER, a citizen of the United States, residing at Cleveland, in the county of Cuyahoga and State of Ohio, have invented certain new and useful Improvements in Clamps for Eyeglasses, of which the following is a specification.

My invention relates to improvements in clamping devices for rimless spectacles and eye glasses, and has for its object to produce a clamp that is readily adjusted to any thickness of glass used in the finished lens of spectacles or eye glasses.

A further object of my invention is to avoid the necessity of drilling a hole through the glass, as has always been necessary heretofore, though I do not limit myself to this exceptional construction in the practice of my invention as it will be readily seen that by changing the position of the securing screw and openings therefor, this device, like those heretofore, can be used on lenses having the usual perforations.

One of the distinct and material advantages this style of clamp has over the old style is that it can be adjusted to any thickness of glass without any kinking or undue bending of the metal, and the double bars that engage the edge of the lens prevent any side twisting of the surface clamps, thus also adding rigidity to the fitting and preventing any play of the lens edgewise. All of the above advantages are conspicuous in this clamp and there are others which will appear in the further description. For example, when a non-perforated lens is used as now presented it will be readily seen that the position of the securing screw is changed to a section of the clamp adjacent to the edge of the lens and not through it as before, and preferably a little outside of the line of connection made by the intersection of the edge bars with the surface flanges.

The object of this construction is to allow room for the lens to enter up into the clamp without striking the screw and also to place it in such a position that the bars that engage the edge of the lens will have a bearing on it as it is screwed down, acting as a means of resisting any tendency of the screw to loosen.

In the practice of making and assembling rimless spectacles and eye glasses by the laity, a clamp is used that necessitates the drilling of holes through the glass. These clamps are made of different degrees of space between the two flanges that engage the surfaces of the lens, and have through perforations, one flange being threaded to engage the securing screw, and in addition have single engaging arms extending at right angles on the edge of the glass. A very serious objection to this construction is, that it necessitates the keeping in stock of various sizes of clamps to fit the various thicknesses of lenses, and with the different sized clamps it is very difficult to properly fit them to the lenses and even after careful fitting the liability of breakage is great. Another serious objection in clamps of this construction is, that after being worn the tendency is for the securing screws to loosen, due to the side play in the clamps engaging the edge of the lens. This also gives rise to another objection, that of the surface ears being easily twisted from their original position in fitting, thereby throwing glasses out of their original adjustment.

Figure 11:
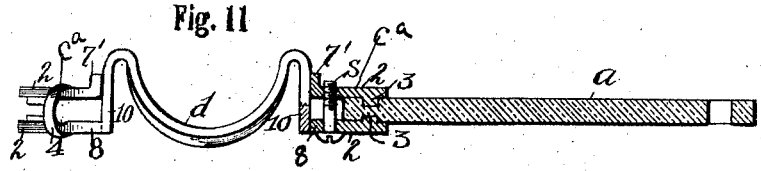
Figure 12:
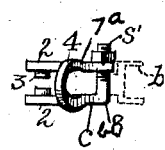

In the accompanying drawings, Figure 1 is a side elevation of a lens and one of my new clamps thereon, and Fig. 2 is a sectional elevation of the clamp as it appears on the lens. Fig. 3 is a plan view of clamp and lens looking down on Fig. 1, and Fig. 4 is a sectional plan on line 4—4, Fig. 2. Fig. 5 is an edge view of lens and clamp on line 5—5, Fig. 1. Figs. 6 and 7 show the clamp spread to fit a thicker lens, Fig. 6 corresponding otherwise to the sectional view in Fig. 4, and Fig. 7 corresponding to edge view Fig. 5. Figs. 8 and 9 show a plan and an edge view respectively of the clamp blank, or before it is bent into clamping shape. Figs. 10 and 11 relate to a modification of the invention showing the clamp as adapted to spectacles, and show elevation and plan views respectively of a spectacle mounting on the improved clamp. Fig. 12 is a plan of a modification of the clamp with an integral binding portion in lieu of the screw, and Fig. 13 is an edge elevation of Fig. 12.

Having reference first to the construction shown in Figs. 1 to 5, inclusive, $c$ represents the clamp as an article or unit, made in a single piece and of skeleton pattern, being open practically its full length between its ends and side edges and hence capable of yielding laterally in its body according to the thickness of the lens and fastened upon the lens with a clamping effect by the screw $s$. The said screw enters through holes in ears in the middle of the clamp outside of the edge of the lens $a$, and the clamping sides proper thereof indicated by 2 are adapted to embrace opposite sides of the lens and have lugs 3 on their inside adapted to engage in circular cavities in the lens. The said cavities have a depth equal to about one-third the thickness of the glass and there is enough spring in the sides 2 of the clamp to enable them to be pressed into engaging position with said lugs 3 in the cavities. When this engagement has been made the ends of the clamp body, or the loops 4 at said ends, are supposed to rest firmly against the lens, whereby a really close fit of the clamp is secured without other fastenings. It will be observed that the said loops or end portions are relatively long so that they afford a firm brace for the lens in both directions edgewise. The box $b$ is adapted to receive the usual bridge-piece for the nose and constitutes a part of the mounting. Said box is provided with a shank 5 which is soldered or otherwise permanently secured to one side of the clamp but free from the other side, and said shank or stud is slightly less in depth than the thickness of the lens so as not to prevent effective clamping of the sides 2 on the lens when the screw is tightened. An original and novel feature herein lies in the construction of the lens with cavities for the lugs of the clamp instead of being bored through as formerly and engaging the clamping screw therein through the lens. So far as I know and believe it has been practically universal experience that this is the crucial point in glasses of this kind because the lens is so greatly weakened by the bore that breakage becomes comparatively easy. Then again the tightening of the screw about the hole is liable to induce splitting of the glass. The present lens with its two cavities affords the remedy because it is not bored through and there is no binding screw penetrating the glass. Instead, I depend practically upon a spring clamping effect instead of a centralized congested locking together which tolerates no yield and is in itself a constant menace to the lens. The present screw comes wholly outside of the lens where its only effect can be to bind the flat sides 2 of the clamp firmly against the surfaces of the lens but not to their injury. However, there is a further practical effect obtained by this position of the screw in the present form of clamp which manifests itself in bringing the lugs 3 and the extremities of loops 4 into interlocking relations on the lens. In other words the effect of tightening the screw extends beyond the sides 2 to the said extremities and lugs and distributes itself to all the points of contact between the clamp and the lens. Specifically, the clamp has relatively short flat outward projections 7 and 8 outside of the screw $s$ between which the shank of box $b$ is engaged, and said box is soldered or otherwise permanently unified with the projection 7 but free as to projection 8, thus leaving the parts adaptable also to lenses of different thicknesses. Thus, in Figs. 6 and 7 a much heavier lens $a'$ is shown than in the preceding views but the same or like box $b$. This spaces the shank 5 so far apart from the projection 8' that it is bent inward instead of remaining in its original parallel relation to the opposite side. The same clamp, however, serves for both thicknesses of lens.

In Figs. 10 and 11 the same invention is shown in connection with a bridge member $d$ for spectacles. The said member is soldered or similarly affixed to the projection 8 of the clamp $c^a$, and since it comes to this projection with its end 10 bent at substantially right angles and transverse to the clamp the opposite projection 7' is bent laterally in braced relation with the said end 10.

Figure 13:
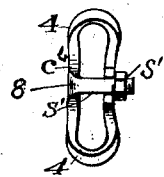

In Figs. 12 and 13 a further modification of the invention is shown wherein the clamp $c^b$ is the same in all particulars as in the foregoing views except that there is no separate clamping screw $s$ but the lug or projection 8 is formed with a prolongation which is bent at right angles and extends across to the other side of the clamp and is threaded at its extremity and provided with a nut so as to form a clamping screw $s'$ in effect and adapted to substitute the screw $s$. The opposite projection or ear $7^a$ is provided with an open slot into which the end of said part $s'$ is pressed and the said nut is tightened thereon. The box $b$ may be soldered directly to the body of the screw $s'$ or secured in some equivalent way, and the bridge piece $d$ for spectacles may be secured thereto in like manner.

It will be understood that the clamp $c$ as a unit or article is distinctly a separate article of manufacture and sale and kept in stock for use with either kind of mounting as described. I may of course add either mounting and some prefer to have this done at the factory, but not necessarily. The adaptability of the clamp to various thicknesses of lenses also is important and this is made possible by having an openwork or skeleton clamp body in which the sides can be more or less contracted as in Fig. 5, or more or less widened as suggested in Fig. 7. By placing rounded pliers in the ends of the loops, the sides of the body may be spread a uniform distance apart their full length, and by use of flat pliers to the outside end portions the body may be compressed to maintain the sides in parallel relation, instead of the bowed relationship shown in Fig. 5.

One advantage of my invention over present practices and constructions is that the clamp may be spread or contracted to fit lenses of different thicknesses without changing the distance from the center of the lugs 3 to the edge-bearing extremities of the loops 4, thereby maintaining the working relations between the lugs and the cavities in the lens. The same advantage accrues in a skeleton clamp $c$ having screw openings in the clamping sides 2 in lieu of lugs, and where the clamping screw $s$ passes through the lens instead of outside of the edge thereof as shown. In Fig. 8, the circle designated by 3 may either be an opening or a lug.

What I claim is:

1. A lens clamp having edge-bearing portions open lengthwise between its sides and ends and provided at its middle with parallel projecting portions adapted to be clamped upon the surfaces of the lens, and a clamping member for said portions.

2. A lens clamp comprising a skeleton body having brace portions open practically the full length thereof, adapting said clamp to yield laterally for different thicknesses of lenses, and means to secure said body upon the lens with a clamping effect.

3. A clamp adapted to fit lenses of different thicknesses, comprising a skeleton body having separate clamping sides to engage the surfaces of the lens and longitudinally-divided braces to engage the edge of the lens, and means to secure said clamp upon the lens.

4. An adjustable clamp for lenses of different thicknesses comprising a body of skeleton pattern having clamping sides 2 and bracing loops 4, and a clamping member to contract said body.

5. A lens clamp having transverse holes and provided with divided braces having transverse portions to engage the edge of the lens, whereby the clamp may be bent according to the thickness of the lens without altering the position of the said openings relatively to the edge of the lens, in combination with a clamping screw.

6. A clamp for lenses having a skeleton body curved lengthwise and provided with loop shaped ends and flat side portions inside at its middle having lugs to engage the glass and transversely perforated ears on its outside adapted to receive a clamping screw.

7. A lens clamp having surface-clamping sides and edge-clamping extensions separated lengthwise to permit transverse contraction or expansion for lenses of different thicknesses, a clamping device, and means to support said clamp attached to a part thereof.

8. A lens clamp having separate brace extensions connected at their ends to engage the edge of the lens and having parallel clamping sides and a clamping member therebetween, and a stud secured to one side portion of said clamp.

9. A lens clamp comprising an elongated skeleton body of pliant metal providing separated clamping sides and ends for both surfaces and the edge of the lens, said body being uniformly compressible and expansible transversely between its ends to fit lenses of different thicknesses, in combination with a clamping device for said clamp.

10. A clamp for eye glasses having a body open lengthwise between its ends and provided with outward projections at its middle, a clamping member, and a mounting permanently secured to one of said projections and separate from the other.

In testimony whereof I affix my signature in presence of two witnesses.

GEORGE A. SQUIER.

Witnesses:
 E. M. FISHER,
 F. C. MUSSUN.

Copies of this patent may be obtained for five cents each, by addressing the "Commissioner of Patents, Washington, D. C."